US007818620B2

(12) United States Patent
Nagano et al.

(10) Patent No.: US 7,818,620 B2
(45) Date of Patent: Oct. 19, 2010

(54) PROGRAM FAILURE ANALYSIS SYSTEM, FAILURE ANALYSIS METHOD, AND EMULATOR DEVICE

(75) Inventors: Takehiko Nagano, Fujisawa (JP); Toru Nojiri, Tokyo (JP); Tomohiko Shigeoka, Yokohama (JP)

(73) Assignee: Hitachi, Ltd., Tokyo (JP)

( * ) Notice: Subject to any disclaimer, the term of this patent is extended or adjusted under 35 U.S.C. 154(b) by 595 days.

(21) Appl. No.: 11/832,040

(22) Filed: Aug. 1, 2007

(65) Prior Publication Data
US 2008/0034255 A1 Feb. 7, 2008

(30) Foreign Application Priority Data
Aug. 1, 2006 (JP) .............................. 2006-209341

(51) Int. Cl.
*G06F 11/00* (2006.01)
(52) U.S. Cl. ...................................................... 714/34
(58) Field of Classification Search .................... 714/34
See application file for complete search history.

(56) References Cited
U.S. PATENT DOCUMENTS
4,549,296 A * 10/1985 Castel et al. ................. 714/45

| 4,679,195 | A  | * | 7/1987  | Dewey ..................... 714/34 |
| 5,056,091 | A  | * | 10/1991 | Hunt ....................... 714/10 |
| 5,488,688 | A  | * | 1/1996  | Gonzales et al. ......... 714/34 |
| 7,360,117 | B1 | * | 4/2008  | Boike et al. ............. 714/34 |
| 7,472,323 | B1 | * | 12/2008 | Greenley et al. ......... 714/34 |

FOREIGN PATENT DOCUMENTS
JP 11-024959 1/1999
JP 2001-034503 2/2001

* cited by examiner

Primary Examiner—Michael C Maskulinski
(74) Attorney, Agent, or Firm—Antonelli, Terry, Stout & Kraus, LLP.

(57) ABSTRACT

A CPU forced stop signal is used as means for stopping execution of a program executed on a ROM by a CPU of a target system. A time required for stopping the CPU from the issuance of the CPU forced stop signal between an ICE device and the CPU is considered and set, and a CPU forced stop signal issuance position which is prior to a stop target position is determined. Based on a real-time tracing function of the CPU, at an issuance position and timing of the CPU forced stop signal on the execution of the program, the CPU forced stop signal is issued, the CPU is stopped, and the event is acquired. By this means, an arbitrary number of events of the program can be acquired regardless of the number of breakpoint registers.

16 Claims, 14 Drawing Sheets

FIG. 2

| | USER REGISTERING EVENT INFORMATION | | |
|---|---|---|---|
| ID | EVENT GENERATION POSITION | MESSAGE | REFERENCE VARIABLE INFORMATION |
| 1 | PROGRAM NAME · NUMBER OF ROWS | MESSAGE CONTENTS | VARIABLE 1, VARIABLE 2, ... |
| 2 | ... | ... | ... |
| ... | ... | ... | ... |

FIG. 3

EVENT INFORMATION TABLE 430

| ID | EVENT GENERATION POSITION (PROGRAM NAME·NUMBER OF ROWS) | EVENT GENERATION ADDRESS (ADDRESS VALUE) | MESSAGE (MESSAGE CONTENTS) | CPU FORCED STOP SIGNAL ISSUANCE POSITION (ADDRESS VALUE) | REFERENCE VARIABLE INFORMATION (VARIABLE 1, VARIABLE 2, ...) | DETAILS OF VARIABLE MEMORY INFORMATION (ACQUIRING POSITION) (ADDRESS VALUE REGISTER NAME) |
|---|---|---|---|---|---|---|
| 1 | ... | ... | ... | ... | ... | ... |
| 2 | ... | ... | ... | ... | ... | ... |
| ... | | | | | | |

FIG. 4

| REAL-TIME TRACING RESULT ||| 431 |
|---|---|---|
| ID | TIME | COMMAND IN EXECUTION |
| 1 | TIME INFORMATION | ADDRESS VALUE OF COMMAND |
| 2 | ... | ... |
| ... | ... | ... |

FIG. 5

| EVENT TRACING RESULT ||| 432 |
|---|---|---|
| ID | TIME | TRACING CONTENTS |
| 1 | TIME INFORMATION | MESSAGE, CONTENTS OF PROGRAM IN EXECUTION |
| 2 | ... | ... |
| ... | ... | ... |

```
000000000040049c <main>:                    — 433

40049c:    push    %rbp
40049d:    mov     %rsp,%rbp
4004a0:    sub     $0x10,%rsp
4004a4:    movl    $0x0,0xfffffffffffffffc(%rbp)     ⎫
4004ab:    movl    $0x1,0xfffffffffffffff8(%rbp)     ⎬ 434
                                                     ⎭
           ...
           ...
```

<END PROCESS>

*FIG. 11*

| 4004a1: | mov | 0xfffffffffffffff8(%rbp),%eax |
|---|---|---|
| 4004a4: | cmp | 0xfffffffffffffffc(%rbp),%eax |
| 4004a7: | jl | 4004ab <main+0x27> |
| 4004a9: | jump | 4004c5 <main+0x41> |
| 4004ab: | mov | 0xfffffffffffffff8(%rbp),%eai |
| 4004ae: | mov | $0x40045ac,%edi |
| 4004ae: | mov | $0x0,%eax |
| 4004b3: | callq | 4003b0 <_init+0x38> |
| 4004b8: | lea | 0xfffffffffffffff8(%rbp),%rax |
| 4004bd: | incl | (%rax) |
| 4004c3: | jump | 4004a1 <main+0x1d> |

| | | |
|---|---|---|
| 400493: | cmpl | $0x0,0xfffffffffffffffc(%rbp) |
| 400497: | jne | 4004aa <main+0x26> |
| 400499: | mov | $0x4005bc,%edi |
| 40049e: | mov | $0x0,%eax |
| 4004a3: | callq | 4003b0 <_init+0x38> |
| 4004a8: | jump | 4004d0 <main+0x4c> |
| 4004aa: | cmpl | $0x1,0xfffffffffffffffc(%rbp) |
| 4004ae: | jne | 4004c1 <main+0x3d> |
| 4004b0: | mov | &0x4005c1,%edi |
| 4004b5: | mov | &0x0,%eax |
| 4004ba: | callq | 4003b0 <_init+0x38> |
| 4004bf: | jump | 4004d0 <main+0x4c> |
| 4004c1: | mov | &0x4005c1,%edi |
| 4004c6: | mov | &0x0,%eax |
| 4004cb: | callq | 4003b0 <_init+0x38> |
| 4004d0: | mov | 0xfffffffffffffffc(%rbp),%eax |

436 brackets rows 400493–4004a8
437 brackets rows 4004aa–4004bf
438 points to row 4004d0

<EVENT TRACING PROCESS>

<REAL-TIME TRACING PROCESS>

| BRANCH NODE TABLE | | |
|---|---|---|
| BRANCH COMMAND | BRANCH SOURCE ADDRESS | BRANCH DESTINATION ADDRESS |
| jump | 0x0100 | 0x0400 |
| jump | 0x0200 | 0x0400 |
| jump | 0x0700 | 0x3500 |

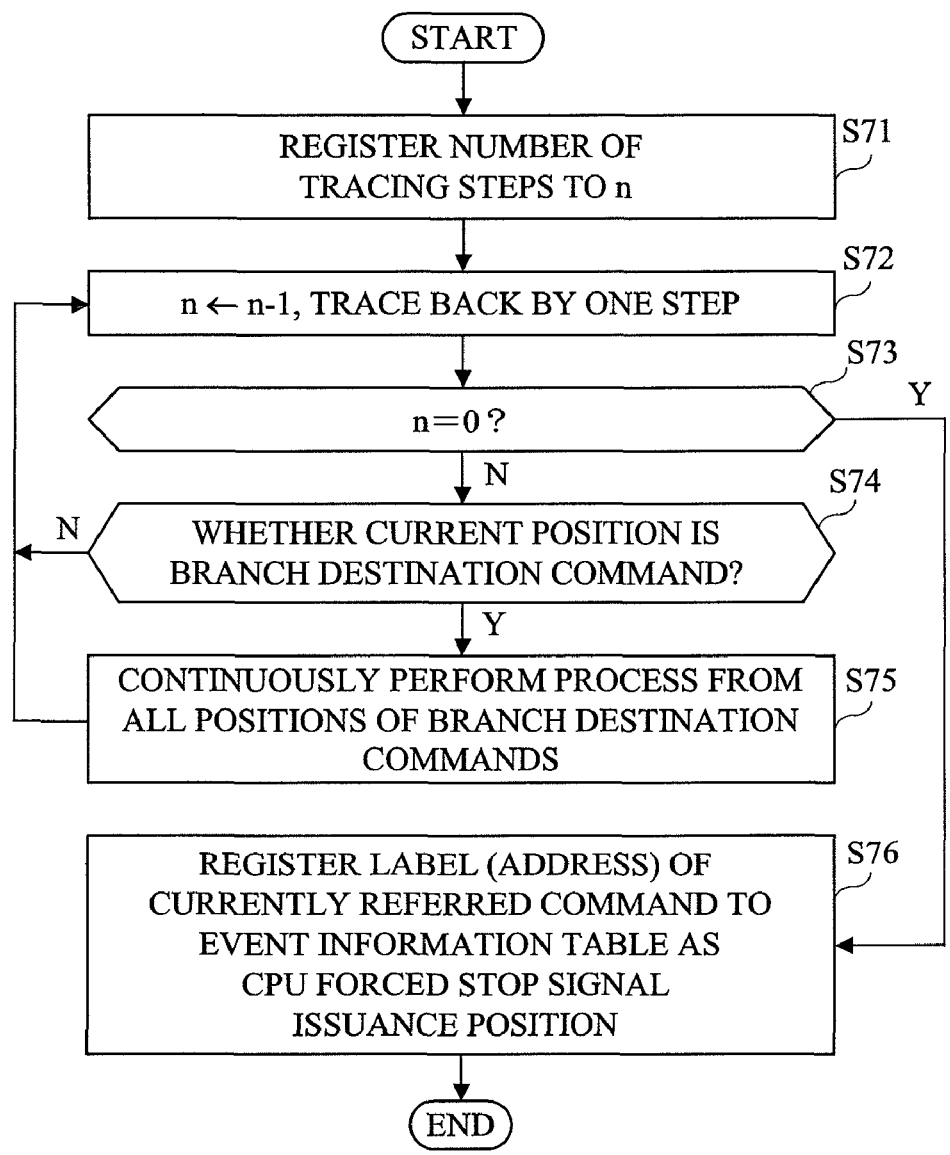

PROGRAM FAILURE ANALYSIS SYSTEM, FAILURE ANALYSIS METHOD, AND EMULATOR DEVICE

CROSS-REFERENCE TO RELATED APPLICATION

The present application claims priority from Japanese Patent Application No. JP 2006-209341 filed on Aug. 1, 2006, the content of which is hereby incorporated by reference into this application.

TECHNICAL FIELD OF THE INVENTION

The present invention relates to an information processing device and system for performing the debugging and the failure analysis for an information processing device and system executing a program. In particular, it relates to a technology for a failure analysis system that is configured by combining a CPU having a debugging function, an ICE (In-Circuit Emulator) device which can control the CPU, and a debugger compatible with the ICE device and can perform the event tracing.

BACKGROUND OF THE INVENTION

In the conventional technology for the event tracing using a debugger, as described in Japanese Patent Application Laid-Open Publication No. 2001-34503 (Patent Document 1), an event is generated at an arbitrary position on a program by using a breakpoint, the program in execution is stopped, and then, the information of the stopped program is referred and acquired. By this means, the tracing is performed.

Two types of technologies are known for the technology of the breakpoint. The first is the hardware break provided as a debugging function of a CPU, and the second is the software break in which a part of the program to be debugged is replaced with a trap command.

Further, in addition to the two types of event tracing, as a method for checking the behavior of a program, the real-time tracing is known. Also, as described in Japanese Patent Application Laid-Open Publication No. 11-24959 (Patent Document 2), a method in which the tracing information is transmitted by a variable-length packet has been proposed as a technique for improving the real-time property of the real-time tracing function.

In the event tracing using the software break according to the conventional technology, the position of a program where the event is acquired is specified by a debugger. The debugger converts the specified position of the program into an address value on an execution module of the program, and replaces a command of the address value of the execution module stored on a memory of a target board (system to be debugged) with a trap command of a CPU. If the trap command is executed when a CPU is executing the program, the CPU stops by its own function. The memory reference, the register reference, and the tracing of the stack are performed during the time when the CPU is stopped, and the information thereof is recorded in a buffer together with time information.

Further, when acquiring the event information using the hardware break, the position where the event is acquired is specified using a debugger. The debugger converts the specified position of a program into an address value on an execution module of the program, and registers it in a breakpoint register present on a CPU of the target board. A value of a program counter and a value of the breakpoint register are compared during the time when CPU is executing the program, and when they match, the CPU stops by itself. The memory reference, the register reference, and the tracing of the stack are performed during the time when the CPU is stopped, and the information thereof is recorded in a buffer together with time information.

Further, the real-time tracing is achieved by using a debugging function of a CPU, the ICE device, and an interface connector. The ICE device and the CPU are directly connected by the interface connector. During the time when the program to be traced is in execution, the debugging function of a CPU monitors a value of a program counter. When a value of the program counter is changed, the debugging function of the CPU records the value in a buffer area of the CPU. When the value recorded in the buffer area exceeds a threshold value, the debugging function of the CPU transmits the data recorded in the buffer to the ICE device. When the ICE device receives the data, it records the data in the buffer of the ICE device together with the time information.

SUMMARY OF THE INVENTION

The breakpoint as described above is used for the conventional event tracing function. Therefore, when the event tracing of a program operated on a ROM such as a program of a built-in system is to be performed, the software breakpoint that rewrites the program cannot be used. Also, since the hardware breakpoint depends on the number of breakpoint registers provided by a CPU, an arbitrary number of events cannot be generated.

The present invention has been made in consideration of the problems as described above, and an object of the present invention is to provide a technology in which, in a technology for the debugging and the failure analysis system using the event tracing, even when the event tracing for a program operated on a memory (ROM) of a target system such as a built-in system is to be performed, an arbitrary number of stop target positions (event generation position) in a program can be registered without being limited by the number of breakpoint registers provided by the target system (CPU), and consequently a large number of events can be acquired.

The typical ones of the inventions disclosed in this application will be briefly described as follows. For the achievement of the above-described object, the present invention provides a technology for a failure analysis system for a built-in system, which comprises means for performing event tracing of a program executed by a system to which debugging and failure analysis are performed, and the failure analysis system is realized by combining a target system having a debugging function including an event tracing function and provided with a CPU (processor) for executing a program on a memory, an ICE device connected to the CPU of the target system through an interface (input/output mechanism) and having a debugging function of the CPU and a CPU controlling function to control the CPU through the interface, and a host computer provided with a debugger having an ICE controlling function compatible with the ICE device, and it is characterized by comprising the technological means as follows.

This system does not use the method of breakpoint but uses the CPU forced stop signal (command) as means for stopping a program in execution in a CPU of a target system for the event tracing. Based on the control from the debugger of a host computer, the CPU forced stop signal is given from the ICE device to the CPU of the target system through the interface, and the program execution is stopped by the CPU forced stop function of the corresponding CPU itself. However, different from the case of using the breakpoint, in the case of using the CPU forced stop signal, the stop at the timing of executing the specific command in a program, that is, at the stop target position (event generation (acquisition) position) and the corresponding process step is impossible.

Therefore, in the present invention, in the case of using the CPU forced stop signal, a CPU forced stop signal issuance position (in other words, process step on a program corresponding thereto) which is prior to the stop target position (event generation position) is determined based on the consideration and settings of the time required for the process in which the CPU actually stops the program between the ICE device and the target system (CPU) (required time). The required time corresponds to the process step on a program. The required time is set in a debugger and others of a system in advance by, for example, a user or a maker.

This system has a configuration as follows. That is, the CPU controlling function of the ICE device has a function to issue and output the CPU forced stop signal to the CPU of the target system. The CPU of the target system has a function to forcibly stop its own operation in response to the input of the CPU forced stop signal. Based on the control from the debugger, the tracing of execution of a program from the CPU to the ICE device is performed by the event tracing function of the CPU. Based on the time and the process step required for the process in the ICE device and the target system, the CPU forced stop signal issuance position prior to the stop target position (event generation position) registered by a user is determined. At the timing of the issuance position based on the tracing at the position of a program in execution, the CPU forced stop signal is issued and outputted from the ICE device to the CPU. By this means, the operation of the execution of the program by the CPU is stopped at the stop target position or a position just before it, thereby acquiring the event at the stop target position.

In particular, in this system, the debugging function of a CPU has a real-time tracing function, and the real-time tracing of the execution of a program from the CPU to the ICE device is performed by the real-time tracing function. At the timing of the issuance position based on the real-time tracing, the CPU forced stop signal is issued and outputted from the ICE device to the CPU.

The effects obtained by typical aspects of the present invention will be briefly described below. According to the present invention, in the technology for the debugging and the failure analysis system using the event tracing, even when the event tracing for a program operated on a memory (ROM) of a target system such as a built-in system is to be performed, an arbitrary number of stop target positions (event generation position) in a program can be registered without being limited by the number of breakpoint registers provided by the target system (CPU), and consequently a large number of events can be acquired. As a result, the efficiency of the debugging and the failure analysis for a target system such as a built-in system can be improved.

BRIEF DESCRIPTIONS OF THE DRAWINGS

FIG. 2 is a diagram showing contents of event information registered by a user in the failure analysis system according to the present invention;

FIG. 3 is a diagram showing contents of an event information table in the failure analysis system according to the present invention;

FIG. 4 is a diagram showing an example of a result of the real-time tracing in the failure analysis system according to the present invention;

FIG. 5 is a diagram showing an example of a result of the event tracing in the failure analysis system according to the present invention;

FIG. 11 is a diagram for describing the retrieval of a head position and an end position of the loop process in the program in the failure analysis system according to the present invention;

FIG. 12 is a diagram for describing the retrieval of a head position and an end position of the branch process in the program in the failure analysis system according to the present invention;

FIG. 17 is a flow diagram of the CPU forced stop signal issuance position determining process using the branch node table in the failure analysis system according to the present invention.

DESCRIPTIONS OF THE PREFERRED EMBODIMENTS

Hereinafter, embodiments of the present invention will be described in detail with reference to the accompanying drawings. Note that components having the same function are denoted by the same reference symbols throughout the drawings for describing the embodiment, and the repetitive description thereof will be omitted.

First Embodiment

Figure 1:
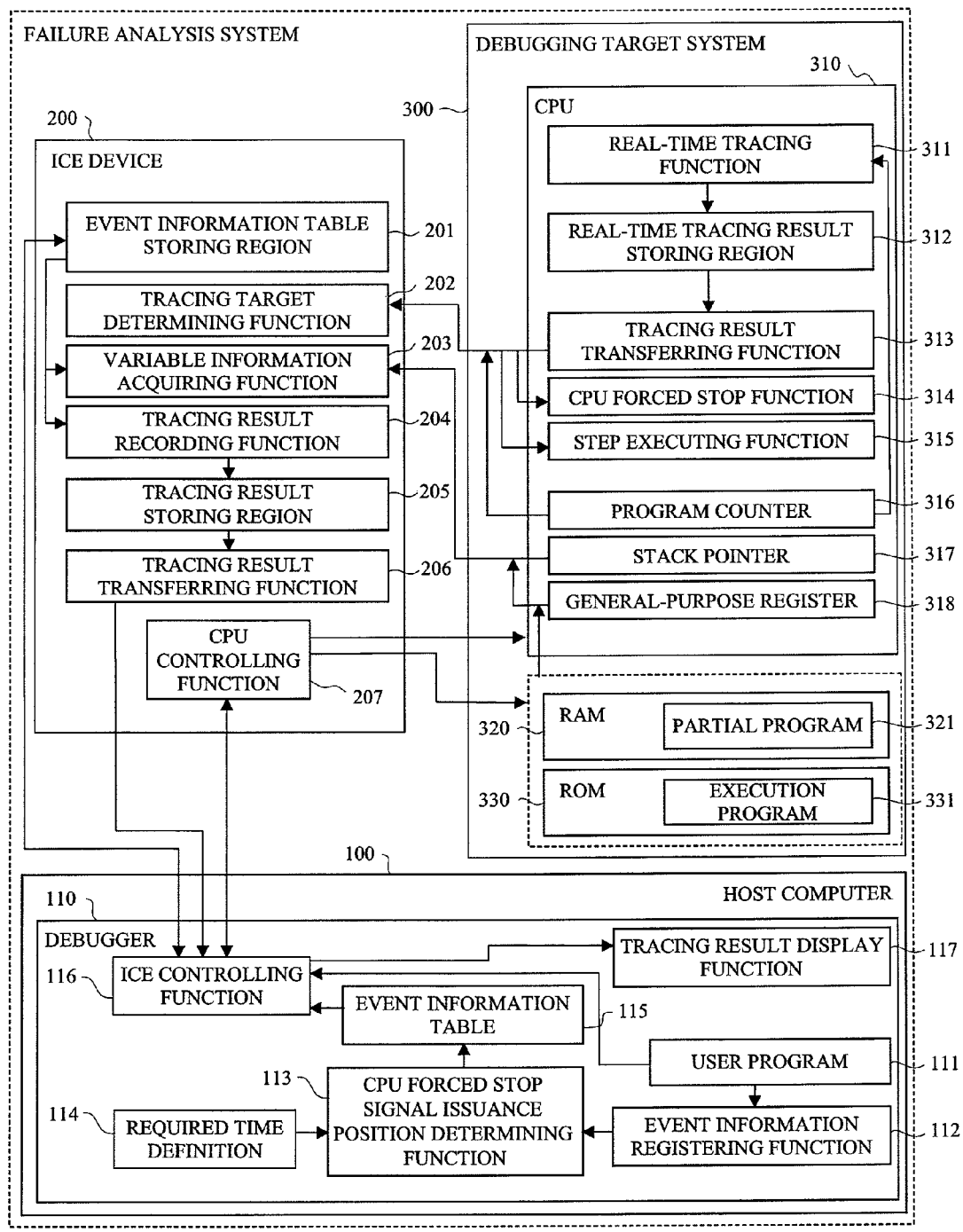
FIG. 1 is a diagram showing an entire functional block configuration of a failure analysis system according to the present invention.
Figure 6:
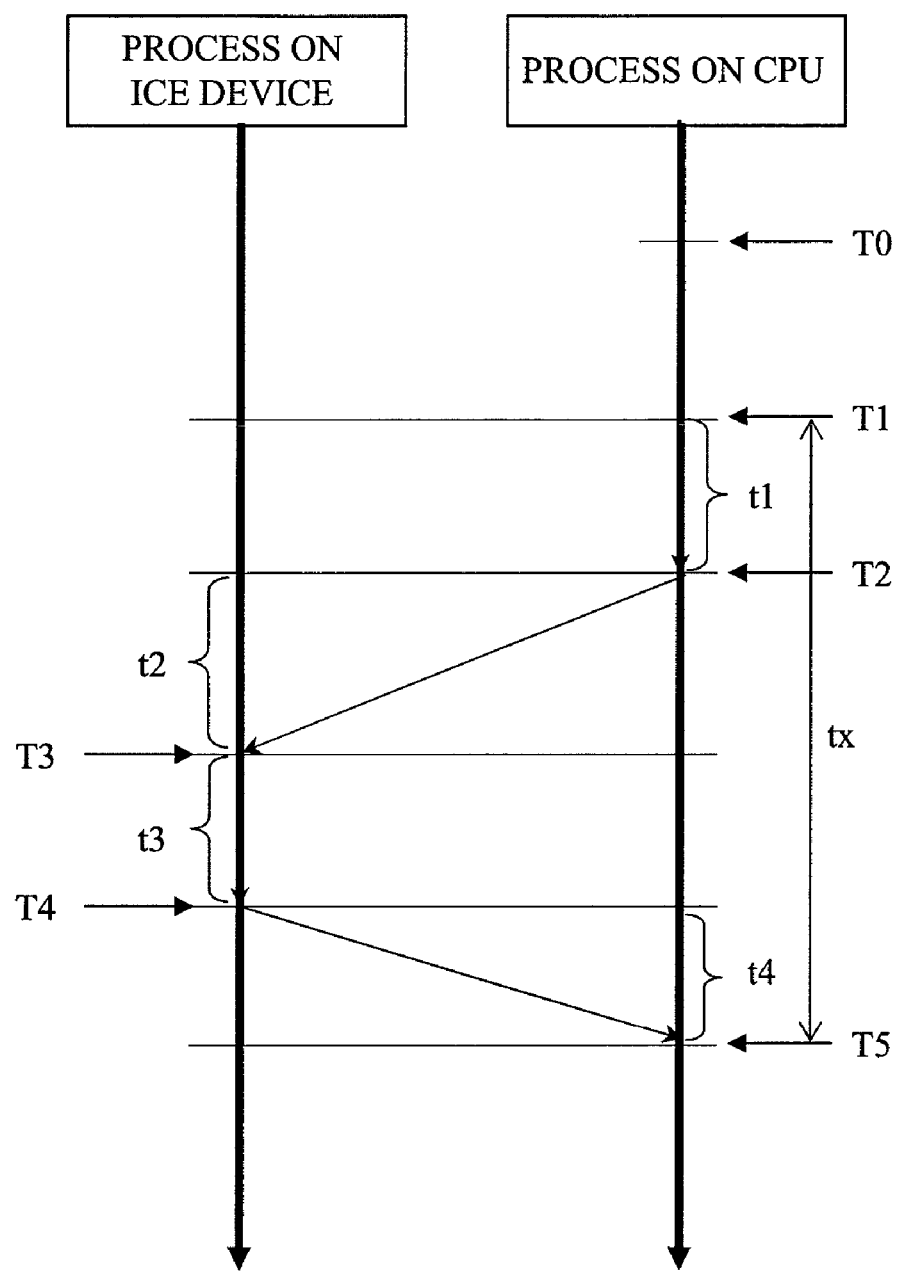
FIG. 6 is a diagram for describing the time required for the process between the ICE device and the CPU of the target system in the failure analysis system according to the present invention.

The failure analysis system according to the first embodiment of the present invention will be described with reference to FIG. 1 to FIG. 15. FIG. 1 shows a configuration of the failure analysis system. FIG. 2 to FIG. 5 show examples of information data processed by this system. FIG. 6 shows a required time for the characteristic control in this system.

FIG. 7, FIG. 9, FIG. 10, and FIG. 13 to FIG. 15 show the process flows in this system. FIG. 8, FIG. 11, and FIG. 12 show examples of the program processed in this system.

The failure analysis system according to this embodiment is an information processing system which can realize the debugging and the failure analysis capable of performing the tracing of an arbitrary number of events by using a CPU forced stop signal (command) for the program (331) executed on a CPU (310) and a ROM (330) of a target system (300) serving as a built-in system. Note that, in the following description, the number of cycles required for executing one command (or process step) on a program is 1 regardless of the types of commands. In the configuration in which the number of cycles required for each command differs depending on the commands, the number of cycles required for each command is defined with reference to the specifications of the CPU (310), and the obtained value is used.

<System>

The functional block configuration of the entire failure analysis system will be described with reference to FIG. 1. In the failure analysis system (information processing system) 1000 is configured of a host computer 100, an ICE device (in-circuit emulator device) 200, and a debugging target system (target system) 300. The target system 300 is a system to be a target of the debugging and the failure analysis performed by a debugger 110 of the host computer 100 used by a user and the ICE device working together with it, and it is, for example, a microcomputer board of a built-in system.

In the host computer 100, the debugger 110 operates and other software and input/output devices (not shown) operate. The ICE device 200 has an independent configuration including a CPU controlling function 207 and others, and it is interposed between the debugger 110 of the host computer 100 and the target system 300. The target system 300 has a configuration including a CPU 310 and memories such as a RAM 320 and a ROM 330. The ICE device 200 and the target system 300 are connected to each other by a predetermined interface.

The debugger 110 has a configuration including a user program 111, an event information registering function 112, a CPU forced stop signal issuance position determining function 113, a required time definition 114, an event information table 115, an ICE device controlling function 116, a tracing result display function 117 and others.

The user program 111 is a program which corresponds to an execution program 331 and is to be a target of the event tracing. Based on the user program 111 on the debugger 110, the execution program (execution module) 331 is introduced onto the ROM 330 of the target system 300 through the ICE device 200.

When a user registers a position on a program where an event is generated (event generation (acquisition) position), contents of the program in execution to be acquired, and a message to be outputted at the event tracing from the user program 111 (execution program 331), the event information registering function 112 records and registers them (event information) in the event information table 115.

The CPU forced stop signal issuance position determining function 113 determines the contents of the event information table 115 by the event information registering function 112 and the issuance position of the CPU forced stop signal by the required time definition 114, and then registers them in the event information table 115.

The required time definition 114 is information of the time (process step) required for the actual process between the ICE device 200 and the CPU 310, which a user defines and sets based on the hardware specifications of the system (including target system 300 and ICE device 200). This required time (tx) is shown also in FIG. 6.

The information (event information) including the event generation (acquisition) position on a program, contents of the program in execution to be acquired, a position where the CPU forced stop signal is issued (CPU forced stop signal issuance position) and others is recorded and registered in the event information table 115. The event information table 115 is shown also in FIG. 3.

The ICE controlling function 116 transmits and receives data between the debugger 110 and the ICE device 200 and controls the ICE device 200.

The tracing result display function 117 acquires the tracing result from the ICE device 200 by using the ICE controlling function 116, and displays the result on the host computer 100.

The ICE device 200 has a configuration including an event information table storing region 201, a tracing target determining function 202, a variable information acquiring function 203, a tracing result recording function 204, a tracing result storing region 205, a tracing result transferring function 206, and a CPU controlling function 207.

The event information table storing region 201 is a region in which contents of the event information table 115 transmitted from the ICE controlling function 116 built in the debugger 110 on the host computer 100 are stored.

The tracing target determining function 202 compares the result of the real-time tracing of the CPU 310 and the data recorded in the event information table storing region 201, and determines whether the CPU forced stop signal is issued and transmitted. When the determination result indicates that the signal is to be issued and transmitted, it transmits the CPU forced stop signal to a CPU forced stop function 314 on the CPU 310. Also, (immediately) after the execution program of the CPU 310 is stopped by the CPU forced stop signal, the tracing target determining function 202 refers to a value of a program counter 316 on the CPU 310, and when the value (stop position) is prior to the target stop position (stop target position, event generation position) in the data recorded in the event information table storing region 201, it controls the CPU 310 so as to execute the steps of the program until the value matches the target stop position by using a step executing function 315 of the CPU 310.

The variable information acquiring function 203 acquires variable information of the program from a stack pointer 317, a general-purpose register 318 on the CPU, memories (RAM 320 and ROM 330) and others after the program executed on the target system 300 is stopped by the CPU forced stop signal.

The tracing result recoding function 204 refers to the information of the event information table storing region 201, and records the result of the event tracing in the tracing result storing region 205.

The tracing result storing region 205 is a region where the result of the event tracing is to be stored.

The tracing result transferring function 206 transfers the contents of the event tracing result storing region 205 to the ICE controlling function 116 of the debugger 110 on the host computer 100.

The CPU controlling function 207 controls the CPU 310 of the target system 300 based on the control from the ICE controlling function 116 of the debugger 110 to start and end the program.

In the target system 300, the CPU 310 has a configuration including a real-time tracing function 311, a real-time tracing result storing region 312, a tracing result transferring function 313, the CPU forced stop function 314, the step executing function 315, the program counter 316, the stack pointer 317, and the general-purpose register 318. As the debugging function of the CPU 310, each function such as the real-time tracing function 311 is provided.

The real-time tracing function 311 stores contents of the program counter 316 in the real-time tracing result storing region 312 together with the time information.

The real-time tracing result storing region 312 is a region where the result of the real-time tracing is to be stored.

The tracing result transferring function 313 monitors the real-time tracing result storing region 312, and when the storing amount thereof exceeds a threshold value, it transfers the tracing result to the tracing target determining function 202 of the ICE device 200.

The CPU forced stop function 314 forcibly stops the operation of the CPU 310, that is, the execution of the program (331) when it receives the CPU forced stop signal transmitted from the CPU controlling function 207 based on the tracing target determining function 202 of the ICE device 200.

The step executing function 315 executes the steps of the program (331).

An address value of the command of the program (331) in execution is stored in the program counter 316. The stack pointer 317 saves the operation state of the CPU 310. A variable and others of the program (331) in execution are stored in the general-purpose register 318.

In the target system 300 which is a built-in system, the execution program 331 corresponding to the user program 111 is provided on the ROM 330, and the CPU 310 directly executes the execution program 331 on the ROM 330 with using also the RAM 320. In a partial program 321 on the RAM 320, a part of the execution program 331 is read and written for the temporal process. The CPU 310 copies a part of the execution program 331 on the ROM 330, which is dynamically changed (read and write parts of a program code) as the partial program 321 onto the RAM 320 at the time of executing the program, and then executes the program. The CPU 310 does not copy a text part in the execution program 331 on the ROM 330 (read-only part of the program code) onto the RAM 320 at the time of executing the program.

<User Registering Event Information>

Contents of the event information registered by a user using the event information registering function 112 will be described with reference to FIG. 2. The contents of the user registering event information 429 include an ID (identification information), an event generation (acquisition) position, a message, reference variable information and others. ID is a management number of an event. The event generation position is expressed by, for example, a program name and its number of rows (row number). The message is recorded and displayed when the event tracing is performed. The reference variable information is a variable value of the program (331) in execution to be referred to at the time of the event tracing. The contents of the reference variable information are recorded by the event information registering function 112 at a position of the same column name in the event information table 115.

<Event Information Table>

The contents (430) of the event information table 115 will be described with reference to FIG. 3. As the contents (430) of the event information table 115, in addition to the contents of the user registering event information 429 in FIG. 2 (event generation position, message, and reference variable information), an event generation address, a CPU forced stop signal issuance position (address), details of variables (memory information acquiring position) and others are recorded.

The event generation address is an address value of the command corresponding to the event generation position. The CPU forced stop signal issuance position (address) is an address value of the command corresponding to the CPU forced stop signal issuance position determined by the CPU forced stop signal issuance position determining function 113. In the details of variables (memory information acquiring position), the information including an address value of the memory (RAM 320, ROM 330) to be acquired and a register name (general-purpose register 318 and the like) showing the contents of the program in execution to be acquired is described.

<Real-Time Tracing Result>

An example of contents (431) of the real-time tracing result to be recorded in the real-time tracing result storing region 312 by the real-time tracing function 311 will be described with reference to FIG. 4. As the contents (431) of the real-time tracing, ID which is a serial number of a log of the real-time tracing, tracing time (time information), command in execution (value of the program counter 316 showing the address value of the command), and others are recorded.

<Event Tracing Result>

An example of contents (432) of the event tracing result recorded in the tracing result storing region 205 by the tracing result recording function 204 will be described with reference to FIG. 5. As the contents (432) of the event tracing result, ID which is a serial number of a log of the event tracing, tracing time (time information), reference results of message contents and reference variable information recorded in the event information table 115 as the tracing contents, and others are recorded.

<Required Time>

The required time (tx), that is, the time (delay time) required for the process in which the value of the program counter 316 is recorded in a buffer in the CPU 310 by the debugging function of the CPU 310, the CPU forced stop signal is issued from the ICE device 200, and the CPU 310 actually stops its own operation will be described with reference to FIG. 6. The left side of FIG. 6 shows a flow of the process on the ICE device 200, and the right side thereof shows a flow of the process on the CPU 310. As the positions on the process, the time and the process step of the execution program (331) are associated.

Between the ICE device 200 and the CPU 310, when the execution program 331 is being executed by the CPU 310, the command corresponding to the CPU forced stop signal issuance position is executed (T1), the execution of the command is transmitted from the CPU 310 (T2), it is received by the tracing target determining function 202 of the ICE device 200 (T3), the execution of the command is determined and the CPU forced stop signal is transmitted (T4), and the execution of the execution program 331 by the CPU 310 is stopped (T5). As described above, the total time of t1 to t4 of the series of processes (required time tx) is required.

T0 denotes a start position of the real-time tracing. T1 is the CPU forced stop signal issuance position (position where its corresponding command is executed), and it shows a position where the CPU forced stop signal is to be issued prior to the actual stop position (T4) and the stop target position. T2 denotes a position where the transmission (transfer) of the tracing result from the CPU 310 to the ICE device 200 is started. T3 denotes a position where the transmission (transfer) of the tracing result is ended. T4 denotes a position where the transmission of the CPU forced stop signal from the ICE device 200 to the CPU 310 is started. T5 denotes a position where the CPU 310 stops the execution of the execution program 311 in response to the reception of the CPU forced stop signal (actual stop position).

t1 denotes the retaining time from when the tracing result is recorded in a buffer (real-time tracing result storing region 312) in the CPU 310 by the debugging function of the CPU 310, in particular, from the CPU forced stop signal issuance position (T1) to the start of the transmission to the ICE device 200 (T2). t2 denotes the data transfer time required from when the debugging function of the CPU 310 transmits the tracing contents to when the tracing target determining function 202 of the ICE device 200 receives the tracing result in the transmission of the tracing result to the tracing target determining function 202 of the ICE device 200 by the debugging function of the CPU 310. t3 denotes the determination time required for the process in which the ICE device 200 determines whether the CPU forced stop signal is to be issued or not based on the information of the received tracing result. t4 denotes the time required from when the tracing target determining function 202 issues and transmits the CPU forced stop signal to the debugging function of the CPU 310 to when the CPU 310 actually stops the execution of the execution program 331. It is desirable that the actual stop position (T5) matches the stop target position (event generation position). However, it does not matter even when T5 is at a step position slightly prior to (just before) the target position.

<Determination of CPU Forced Stop Signal Issuance Position>

Figure 7:
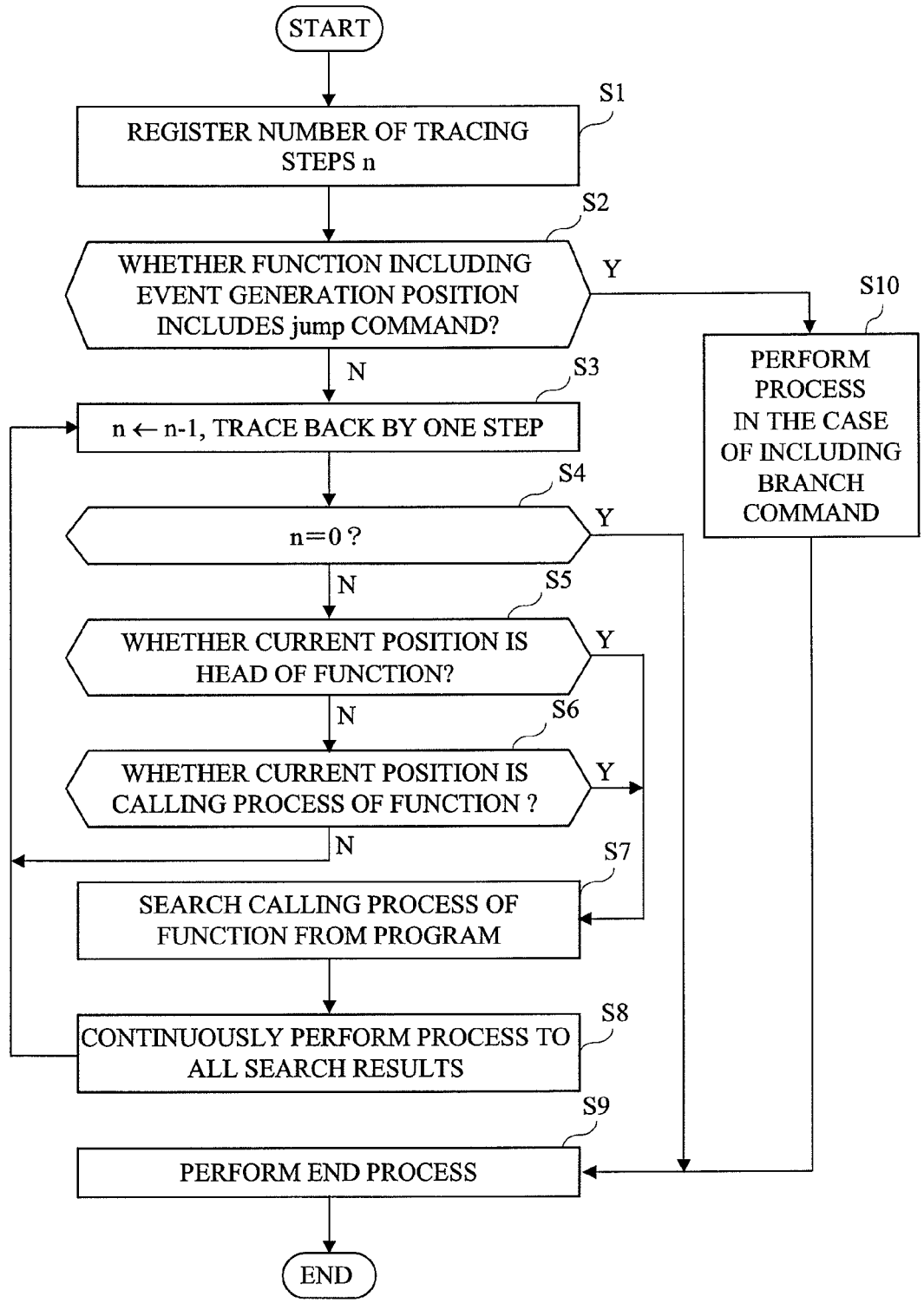
FIG. 7 is a flow diagram of the process of recording and registering the event information registered by a user to the event information table in the failure analysis system according to the present invention.
Figures 8, 9:
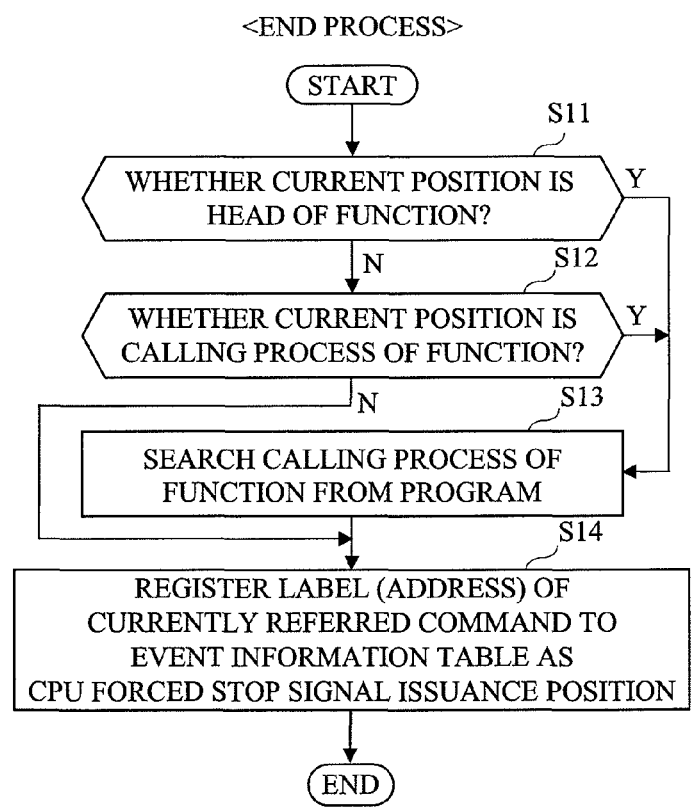
FIG. 8 is a diagram for describing the label (address) and the process step tracing in the program in the failure analysis system according to the present invention.
FIG. 9 is a flow diagram showing the details of the end process in FIG. 6 in the failure analysis system according to the present invention.

The process of the CPU forced stop signal issuance position determining function 113 in the failure analysis system of FIG. 1 will be described below with reference to FIG. 7 to FIG. 9. First, a user registers the event information shown in FIG. 2 in the debugger 110 of the host computer 100 by using the event information registering function 112. When the user completes the registration of all event information, the event information registering function 112 records the event information in the event information table 115 with the format shown in FIG. 3. FIG. 7 to FIG. 9 show the registration of the CPU forced stop signal issuance position in the above-described operation.

<Event Information Registration>

Figure 10:
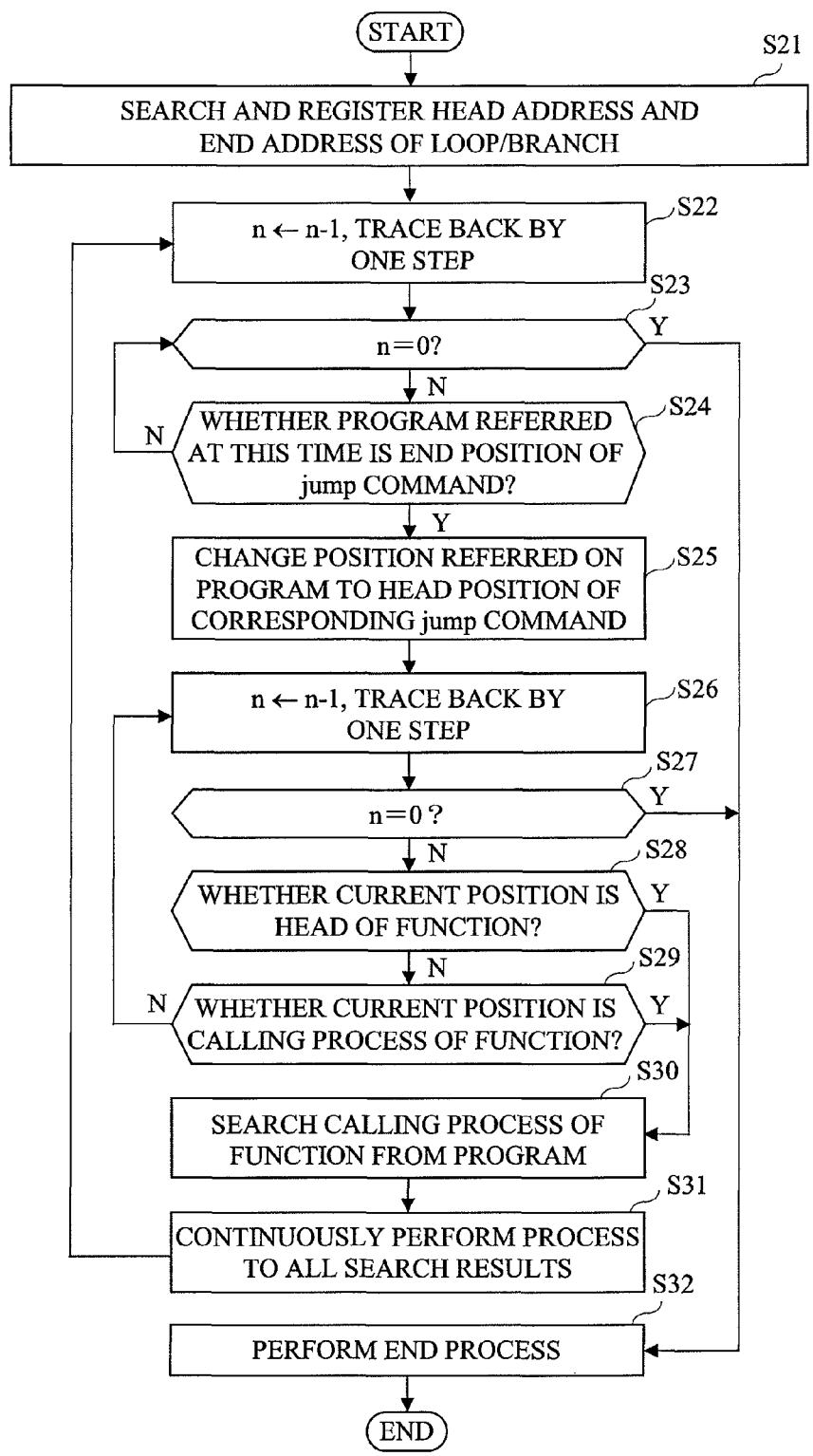
FIG. 10 is a flow diagram showing the details of the case including a branch command (jump command) in FIG. 6 in the failure analysis system according to the present invention.

FIG. 7 shows the process flow for recording and registering the event information registered by a user into the event information table 115 one by one. Note that FIG. 9 and FIG. 10 show a part of the process of FIG. 7. These processes are all performed based on the disassemble result of the execution module (execution program 331) in the user program 111.

In the flow of FIG. 7, when the process is started, the number of tracing steps n in the execution program 331 is first registered in S1 (hereinafter, S denotes the process step of the flow). The number of tracing steps n will be described here.

The method in which the operation (program execution) of the CPU 310 is stopped by using the CPU forced stop signal is different from the method using the breakpoint. In the case of using the breakpoint, the address defined by a user is registered in a breakpoint register on the CPU, and the CPU can be stopped at the timing of executing the address.

However, in the case of the method using the CPU forced stop signal as described in the present embodiment, the required time (tx), that is, the delay time as shown in FIG. 6 occurs from when the CPU forced stop signal is issued to when the operation of the CPU 310 is actually stopped. The time (tx) is the sum total of about four time periods (t1 to t4) described above. Unless the CPU forced stop signal is issued at the position and the timing determined by considering the time (tx) from when the CPU forced stop signal is issued to when the program (331) in execution is actually stopped, the operation of the CPU 310 cannot be stopped at the time when (just before) the target address (stop target position) is being executed.

The required time (tx) described above is the time (process step) which can be defined in advance from the specifications of the system (target system 300 to be used) as described below. For example, t is: {(size of buffer memory on CPU 310 side)÷(size of data to be written)×(execution time per one command)}. t2 is: {(capacity of buffer)÷(data transfer rate)}. t3 is defined as an ignorable time on the assumption that the processing performance of the ICE device 200 to be used is sufficiently high relative to the processing performance of the CPU 310 of the target system 300. t4 is: {(command length of CPU forced stop signal)÷(data transfer rate)}. By dividing the sum total (tx) of the times obtained in advance as described above by the execution time per one command determined by the specifications of the CPU 310, the number of tracing steps n is determined.

By issuing the CPU forced stop signal so as to correspond to the position and the timing (T1) prior to the stop target position (event generation position) by the number of tracing steps n on the execution of the program (331), the operation of the CPU 310 can be stopped at the target position (T5) or just before it. The number of tracing steps n is obtained in advance and is stored as the required time definition 114 in the debugger 110.

Next, in S2, it is checked whether a function including the event generation position currently processed in the execution program 331 includes a jump command (branch command) up to the head of the function.

FIG. 8 shows the case where it does not include the jump command, and FIG. 11 and FIG. 12 show the cases where it includes the jump command. In each row, address, command, and operand are shown. In S2, when referring to the program (331), the head of the function is labeled by the format of <function name> (<main> in this example) as shown in the step (row) of the function label 433 in FIG. 8. Therefore, it is checked whether the jump command is found in the rows between the current position on the current program and the function label. If the jump command is included (Y), the flow proceeds to S10, and the process in the case of including the branch command (jump command) is performed. This process is shown in FIG. 10. If the jump command is not included (N), the flow proceeds to S3, n−1 is substituted for n, and as shown in the step tracing 434 in FIG. 8, the part of the program to be processed is traced back by one step.

Next, in S4, it is determined whether n is 0 or not. When n is 0 (Y), the flow proceeds to S9, and the end process is performed. This end process is shown in FIG. 9. When n is not 0 (N), the flow proceeds to S5, and it is checked whether the current position is the head of a function or not. When it is the head of the function (Y), the flow proceeds to S7. The position calling the currently searched function is retrieved by using the label information shown in the function label 433. Thereafter, the process from S3 is repeated to all the positions calling the function. When the current position is not the head of the function (N), the flow proceeds to S6. In S6, it is determined whether the current position is the calling process of a function or not, and when it is the calling process of the function (Y), the process from S7 is performed similarly to the case where the current position is the head of the function. When it is not the calling process of the function (N), the flow returns to S3, and the process is repeated.

<End Process of Event Information Registration>

The end process of the event information registration in S9 of FIG. 7 will be described in detail with reference to FIG. 9. First, in S11, it is determined whether the current position (current step) is the head of the function or not. When it is not the head of the function (N), the flow proceeds to S12, and it is determined whether the current position is the calling process of the function or not. When it is not the calling process of the function (N), the flow proceeds to S14, and an address value of the program referred at this time is registered as the CPU forced stop signal issuance position. This address value corresponds to the address described at the top of each row in FIG. 8.

When the current position is the head of the function (Y) in the determination in S11 and when it is the calling process of the function (Y) in S12, the flow proceeds to S13. In S13, for all the user programs 111, the position calling the currently referred function is retrieved. The process of S14 is performed to all the positions calling the currently referred function, and the label (address value) of the program referred at this time is registered as the CPU forced stop signal issuance position in the event information table 115.

<Process in the Case of Including Branch Command>

The process in the case where branch command (jump command) is included in S10 of FIG. 7 will be described in detail with reference to FIG. 10. In S10, when jump commands such as the loop process and the branch process are included in the function, the flow proceeds to S21, and the head position (address) and the end position (address) of the loop process and the branch process are searched and registered.

In the case of the loop process, as shown in the loop control 435 in FIG. 11 (an example of jump from the end to the head of the loop process), since the jump destination of the branch process at the end indicates the head address of the loop process, the address of the jump command at the end and the address which is the jump destination of the jump command at the end are registered. In this manner, the head position and the end position can be registered.

In the case of the branch process, as shown by the structures 436 and 437 (step groups) of the first and second branch processes in FIG. 12, the groups including the comparison process for determining whether it matches the branching ("cmpl"), the jump process to the next comparison process at the time of no comparison matching ("jne"), the actual process at the time of comparison matching ("mov", "callq"), and the jump process for escaping from the branch process are combined. In other words, the processes in which the jump command always comes next to the comparison command, and then the jump command comes again are present as many as the number of the branches. Therefore, the jump destination of the jump command found first while tracing back by each one step is registered as the end position 438 and the combination of (comparison command+jump command) present prior to it is searched up to the head of the function, and the address of the comparison command at the head of (comparison command+jump command) is registered as the head position. In this manner, the head position and the end position can be registered.

Next, the flow proceeds to S22, and n−1 is substituted for n to trace back the program by one step. Then, in S23, it is determined whether n is 0 or not. When n is 0 (Y), the flow proceeds to S32, and the end process shown in FIG. 9 is performed and the flow ends. When n is not 0 (N), the flow proceeds to S24, and it is determined whether the program being referred at this time is the end position of the jump command or not. When it is not the end position of the jump command (N), the flow returns to S23. When it is the end position of the jump command (Y), the flow proceeds to S25, and the current position is replaced with the head position of the jump command. Next, in S26, n−1 is substituted for n to trace back the program by one step. Then, in S27, it is determined whether n is 0 or not. When n is 0 (Y), the flow proceeds to S32, and the end process is performed and the flow ends.

When n is not 0 (N) in S27, the flow proceeds to S28, and it is checked whether the current position is the head of the function or not. When it is the head of the function (Y), the flow proceeds to S30, and the position calling the currently searched function is retrieved for all the user programs 111. Then, based on the result thereof, the end process is performed to all the positions calling the function in S31. When it is not the head of the function (N), the flow proceeds to S29, and it is determined whether the current position is the position calling the function or not. When the current position is the position calling the function (Y), the process from S30 is performed similarly to the case where it is the head of the function. When it is not the position calling the function (N), the flow returns to S26, and the process is repeated.

In the determination of the position of acquiring the variable information in the process described above, since the offset value from the base pointer, the value of the register to be referred, and the address value on the memory (RAM 320 and the like) are described in the information of the user program 111 (compiled one), these values are registered.

<Event Tracing>

Figure 13:
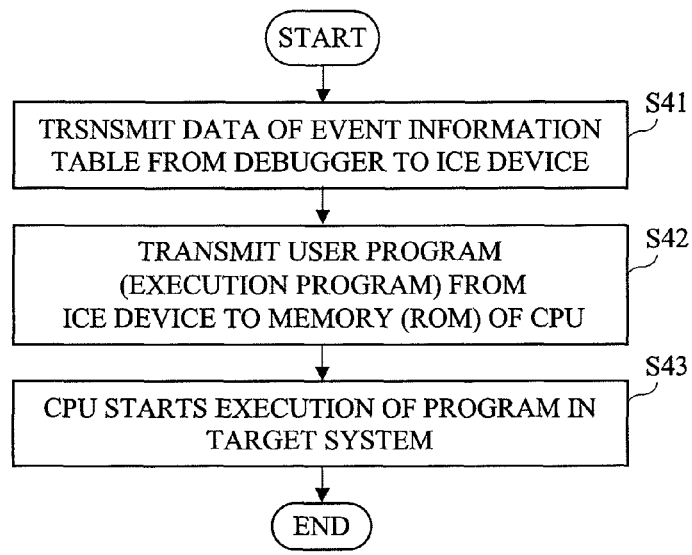
FIG. 13 is a flow diagram of the event tracing process in the failure analysis system according to the present invention.
Figure 14:
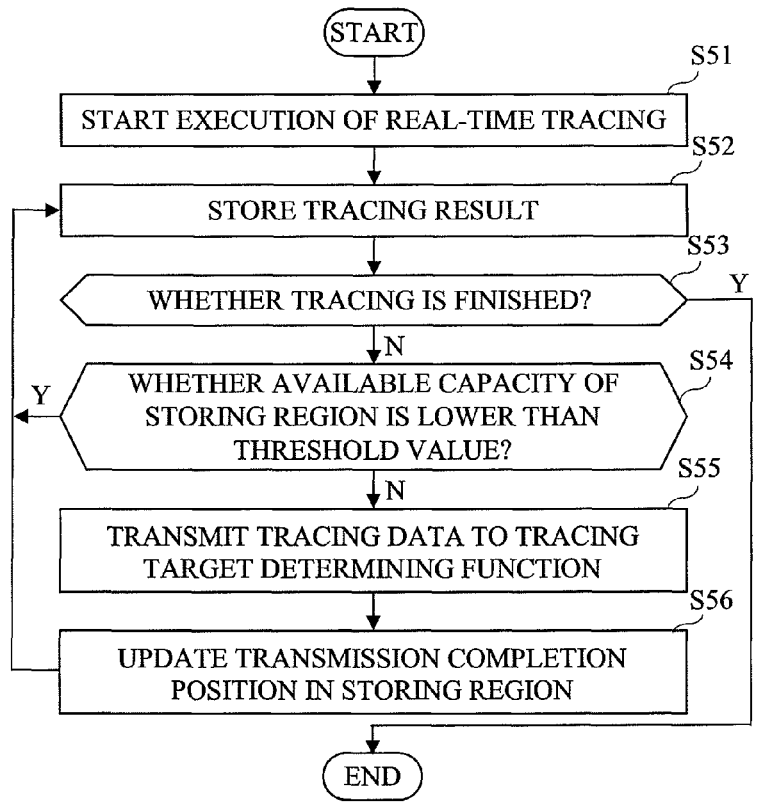
FIG. 14 is a flow diagram of the real-time tracing process in the failure analysis system according to the present invention.
Figure 15:
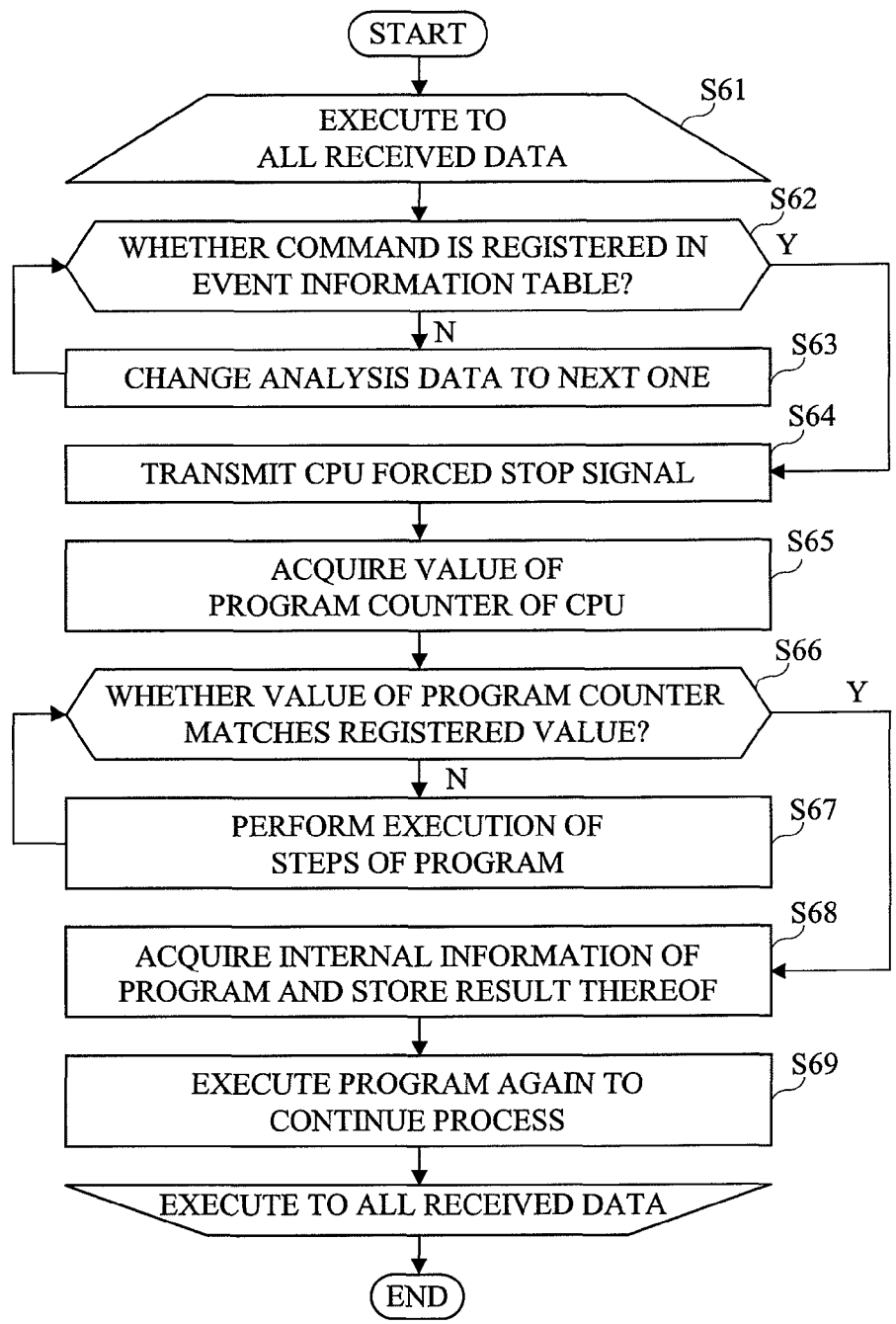
FIG. 15 is a flow diagram showing the details of the event tracing process in another failure analysis system according to the present invention.

Next, the event tracing process using the contents registered in the event information table 115 will be described with reference to FIG. 13 to FIG. 15 and FIG. 4 and FIG. 5. The flow in FIG. 13 shows the flow from the registration of the event information to the ICE device 200 to the actual event tracing. The flow in FIG. 14 shows the process in which the target system 300 performs the real-time tracing and the tracing data is transmitted to the ICE device 200. FIG. 15 shows the case where the ICE device 200 transmits the real-time tracing result, it is determined whether it is the position where the event is generated or not, and the event is generated to perform the event tracing.

First, the flow of the event tracing will be described with reference to FIG. 13. First, in S41, a user transmits the information of the event information table 115 to the event information table storing region 201 of the ICE device 200 by using the ICE controlling function 116 of the debugger 110. Next, in S42, the user program 111 is transmitted to the CPU controlling function 207 of the ICE device 200 by using the ICE controlling function 116 of the debugger 110, and the program (execution program 331) is transmitted from the CPU controlling function 207 to the memory (ROM 330) of the target system 300. Then, in S43, when the CPU 310 starts to execute the program (execution program 331) on the ROM 330, the real-time tracing function 311 of the CPU 310 starts to operate, and consequently the event tracing is started.

<Real-Time Event Tracing>

Next, the real-time tracing process which is the conventionally-known technology will be described with reference to FIG. 14. When the program starts to operate, the CPU 310 acquires the tracing, and transmits the result from the target system 300 to the ICE device 200 and the debugger 110 by using the JTAG interface. This mechanism is described in Japanese Patent Application Laid-Open Publication No. 11-24959 (Patent Document 2), but it is simply described here with reference to FIG. 14.

When the program (331) starts to operate by the CPU 310 in the target system 300, the flow proceeds to S51, and the real-time tracing function 311 starts to operate, and the real-time tracing process is started. Next, in S52, when a value of the program counter 316 of the CPU 310 is changed, the real-time tracing function 311 stores the tracing result in the real-time tracing result storing region 312. Then, in S53, it is determined whether (the information of) the end process of the tracing is transmitted from the CPU controlling function 207 or not, and when it is ended (Y), the tracing process is ended. When the tracing is continued (N), the flow proceeds to S54, and it is determined whether the data (tracing data) stored in the real-time tracing result storing region 312 exceeds the value (threshold value) for transmission or not. When it exceeds the threshold value (N), the flow proceeds to S55, and the tracing data is transmitted to the tracing target determining function 202. Next, in S56, the position of the transmitted data in the real-time tracing result storing region 312 is updated. Thereafter, the flow returns to S52, and the real-time tracing process is continued. When it does not exceed the threshold value (Y) in S54, the flow returns to S52, and the real-time tracing process is continued.

<Real-Time Event Tracing>

Next, the process in which, after the ICE device 200 receives the real-time tracing result, it is determined whether it is the event generation position, and the event is generated to perform the event tracing will be described in detail with reference to FIG. 15. When the real-time tracing function 311 starts to operate in the target system 300, the tracing result is regularly transmitted from the tracing result transferring function 313 to the tracing target determining function 202. The tracing target determining function 202 performs the process from S62 to S69 to all the received data (S61) with reference to the information stored in the event information table storing region 201.

In S62, it is determined whether the command is registered in the event information table 115 or not. When it is not registered (N), the flow proceeds to S63 to process the next data, and the process is continued. When it is registered (Y), the flow proceeds to S64, and the CPU forced stop signal is transmitted to the CPU forced stop function 314 of the CPU 310 by using the CPU controlling function 207. Next, in S65, the information of the program counter 316 of the CPU 310 is acquired by using the variable information acquiring function 203.

Next, in S66, it is determined whether the address of the command registered in the event information table storing region 201 matches the address of the command stored in the program counter 316. When they match (Y), the flow proceeds to S68, and the value of a local variable on the stack frame, the register value, and the value of the variable on the memory are acquired with reference to the values of the stack pointer 317, the general-purpose register 318, and the memories (ROM 330 and RAM 320). Then, they are recorded in the tracing result storing region 205 as the tracing results by using the tracing result recording function 204. Thereafter, in S69, the stop state of the CPU 310 is released by using the CPU controlling function 207, and the process of receiving data is continued.

As described above, according to the first embodiment, a user can perform the event tracing of the user program 111 by using the CPU forced stop signal without using the breakpoint. Accordingly, even when the execution program 331 is operated on the ROM 330 like in the built-in system, an arbitrary number of events can be generated and the tracing can be performed.

Second Embodiment

Next, the second embodiment will be described with reference to FIG. 16 and FIG. 17. The basic configuration of the second embodiment is equivalent to that of the first embodiment, and the second embodiment provides a configuration example for another method of determining the CPU forced stop signal issuance position in the CPU forced stop signal issuance position determining function 113. This determining method shown in FIG. 16 and FIG. 17 corresponds to another example of the process shown in FIG. 6, FIG. 8, and FIG. 9 of the first embodiment, and other processes are equivalent to those of the first embodiment. Note that the number of tracing steps (n) in the program is defined in advance in the same manner as the first embodiment.

Figures 16A, 16B:
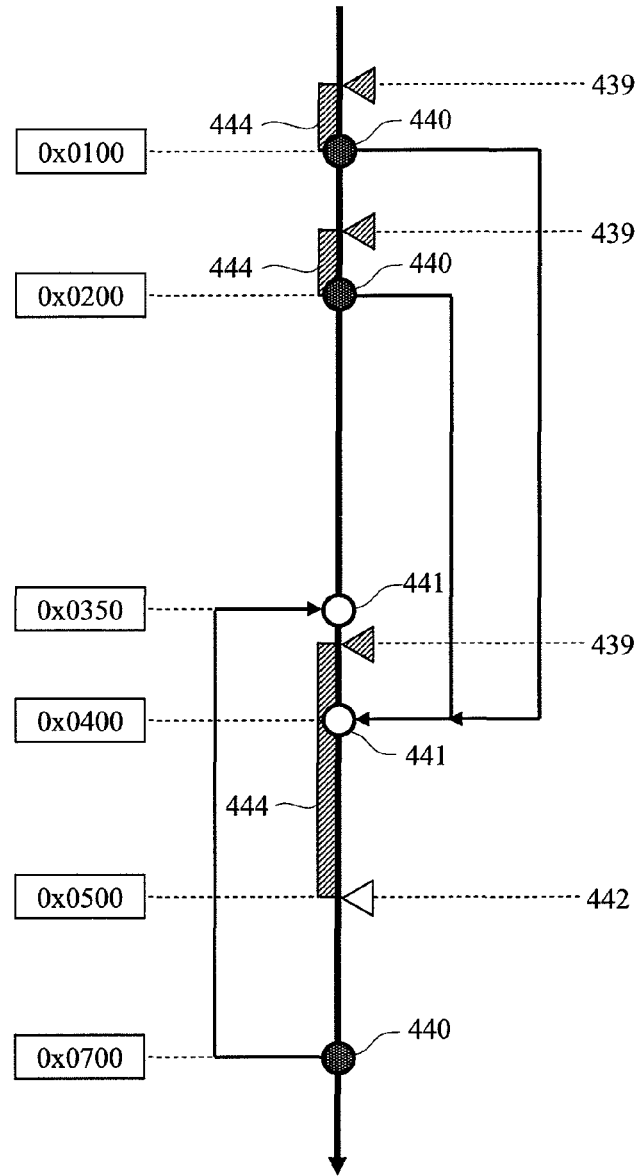
FIG. 16A is a graph showing the branch structure of the program in the failure analysis system according to the present invention.
FIG. 16B is a diagram showing a branch node table in the failure analysis system according to the present invention.

FIG. 16A is a graph showing a part of the program (331) including the branch process. Along the axis of the process step, the left frame represents the address of the process step, circular marks represent the positions of the branch command 440 and its branch destination address 441, and triangular marks represent the CPU forced stop signal issuance position 439 and the event generation position (stop target position) 442. The step group 444 is the set and range of the successive commands, and it corresponds to (all or part of) the required time tx. FIG. 16B is a branch node table 443 corresponding thereto, and it shows the correspondence relation among the branch command 440, the branch source address, and the branch destination address 441.

In the program, basically, the process is sequentially executed from the head to the end. In actual, however, the command which divides the process flow in the course of the program like the branch command 440 is included in many cases, and thus, there are a plurality of process flows in a program in most cases.

Therefore, in order to cover all of the process flows in the program, all the branch commands 440 (jump command and others) in the disassemble result of the program (execution program 331) are picked out, and the label of the branch command corresponding to the branch command 440 is set as a branch source address, and the address of the argument of the branch command is set as a branch destination address. Then, they are registered in the branch node table 443 with the format as shown in FIG. 16B.

When tracing back from the event generation position 442 registered by a user by an arbitrary number of steps on the program, it is checked whether any of the branch destination addresses of the branch node table 443 matches the label of the currently referred command each time when tracing back by one step. When they match, not only the command contiguous to the currently referred command is continuously traced, but also the tracing is performed from the branch source address corresponding to the branch destination address 441, thereby determining the CPU forced stop signal issuance position 439. By this means, all of the process flows connecting to the event generation position 442 on the program can be covered.

The case shown in FIG. 16 will be described as an example. In the case of tracing back the steps from the address '0x0500' of a certain event generation position 442 on a program, when it reaches the address '0x0400', the command contiguous to '0x0400' which is the branch destination address 441 is continuously traced, and the CPU forced stop signal issuance position 439 (between address '0x0350' and '0x0400') in the step group 444 is determined. Furthermore, the command contiguous to the branch source addresses '0x0100' and '0x0200' corresponding to the branch destination address 441 '0x0400' is added to the target to be traced, thereby determining the CPU forced stop signal issuance position 439 (prior to the addresses '0x0100' and '0x0200') in the step group 444.

The process of determining the CPU forced stop signal issuance position by using the branch node table 443 of FIG. 16B will be described as the concrete example with reference to FIG. 17. First, in S71, the number of tracing steps which is defined in advance is registered in the parameter n. Next, in S72, n−1 is substituted for n. Then, in S73, it is determined whether n is 0 or not. When it is 0 (Y), the flow proceeds to S76, and the label (address) of the currently referred command is registered in the event information table 115 as the CPU forced stop signal issuance position. When it is not 0 (N), it is determined whether the current position is the branch destination command (address) or not in S74 with reference to the branch node table 443. When it is the branch destination command (Y), the flow proceeds to S75, and the label of the currently referred command as well as the branch source address of all the rows having the branch destination address matched in the branch node table 443 are added as the target to be processed, and the flow returns to S72 to repeat the process. This is repeated until n becomes 0.

As described above, according to the second embodiment, since all the branch structures of the program (331) are known, the CPU forced stop signal issuance position (439) can be defined on all the flows reaching the event generation position (442) defined by a user. Accordingly, the CPU forced stop signal can be issued so as to correspond to any of the branched flows on the execution of the program (331), and the CPU can be stopped at the event generation position (442) to acquire the event.

In the foregoing, the invention made by the inventors of the present invention has been concretely described based on the embodiments. However, it is needless to say that the present invention is not limited to the foregoing embodiments and various modifications and alterations can be made within the scope of the present invention.

For example, the case where the present invention is applied to the in-circuit emulator device (ICE device) has been described in the embodiments. However, the application of the present invention is not limited to the ICE device, and the present invention can be applied also to the on-chip emulator which debugs the program in the state where a microprocessor is mounted on a board.

What is claimed is:
1. A failure analysis system of a computer comprising:
means for performing an event tracing for a program executed by a system to be a target of debugging and failure analysis;
a target system having a debugging function including an event tracing function and provided with a memory in which the program is stored and a CPU executing the program;
an emulator device connected to the CPU of the target system through an interface and having a CPU controlling function for controlling the debugging function of the CPU and the CPU through the interface; and
a host computer provided with a debugger having an emulator controlling function compatible with the emulator device,
wherein the CPU controlling function of the emulator device has a function to issue and output a CPU forced stop signal to the CPU of the target system,
the CPU of the target system has a function to forcibly stop its own operation in response to an input of the CPU forced stop signal,
the failure analysis system transmits tracing information of execution of the program from the CPU of the target system to the emulator device by the event tracing function of the CPU based on the control from the debugger of the host computer,
an issuance position of the CPU forced stop signal which is prior to a stop target position corresponding to an event generation position registered by a user on the program is determined based on a time and process steps required for a process in the emulator device and the target system, and
at an issuance position and timing of the CPU forced stop signal based on the tracing in execution of the program, the CPU forced stop signal is issued and outputted to the CPU from the CPU controlling function of the emulator device, and in response to an input of the CPU forced stop signal, an operation of execution of the program by the CPU is stopped at the stop target position or a position prior to it, and an event at the stop target position is acquired.

2. The failure analysis system of a computer according to claim 1,
wherein the CPU of the target system has a real-time tracing function,
real-time tracing of execution of the program is performed from the CPU to the emulator device by the real-time tracing function, and
at an issuance position and timing of the CPU forced stop signal based on the real-time tracing in execution of the program, the CPU forced stop signal is issued and outputted to the CPU from the CPU controlling function of the emulator device.

3. The failure analysis system of a computer according to claim 1,
wherein the issuance position and timing of the CPU forced stop signal are determined based on a combined time of:
a first time from when first data of contents of the tracing is stored in the CPU by the debugging function of the CPU to when it is transmitted to the emulator device;
a second time from when the debugging function of the CPU transmits the first data to the emulator device to when the emulator device receives the first data;
a third time when the emulator device determines whether the CPU forced stop signal is issued or not based on the received first data; and
a fourth time from when the emulator device issues and outputs the CPU forced stop signal to the debugging function of the CPU to when the CPU forced stop signal is inputted to the CPU and an operation of execution of the program is stopped.

4. The failure analysis system of a computer according to claim 1,
wherein the memory of the target system has a ROM in which the program is stored and a RAM in which a part of the program is stored, and
the CPU of the target system directly executes the program on the ROM with using the RAM.

5. The failure analysis system of a computer according to claim 1,
wherein definition of the required time and the process steps is set in advance to the debugger of the host computer, and
the debugger of the host computer determines the issuance position of the CPU forced stop signal based on the setting.

6. The failure analysis system of a computer according to claim 1,
wherein the CPU of the target system has a step executing function for the program, and
the CPU of the target system stops an operation of execution of the program in response to an input of the CPU forced stop signal from the emulator device at a position prior to the stop target position, and executes steps of the program up to the stop target position by the step executing function, thereby acquiring an event at the stop target position.

7. The failure analysis system of a computer according to claim 1,
wherein the debugger of the host computer performs a registration process of event information relating to execution of the event tracing by a user,
the emulator device performs:
a process of storing the event information;
a process of storing data of the tracing from the CPU of the target system;
a process of comparing the data of the tracing and the data of the event information, thereby determining whether it is a target of the tracing and the CPU forced stop signal is issued; and
a process of transferring the data of the tracing to the debugger, and
the debugger of the host computer displays the data of the tracing based on contents of the event information.

8. The failure analysis system of a computer according to claim 1,
wherein the debugger of the host computer analyzes a relation of calling of a function by tracing back process steps of execution program of the CPU in accordance with the event generation position registered by a user, and determines the issuance position of the CPU forced stop signal.

9. The failure analysis system of a computer according to claim 8,
wherein the debugger of the host computer determines all the issuance positions of the CPU forced stop signal corresponding to the event generation position by analyzing a relation of a branch source address and a branch destination address in a position including all branch commands in the execution program of the CPU.

10. A failure analysis method for performing failure analysis of a computer program of a CPU of a system by connecting an emulator device, comprising:

a step of transmitting tracing information of program execution of a CPU from the CPU of the system to the emulator device;
a step of determining an issuance position of the CPU forced stop signal, which is prior to a stop target position corresponding to an event generation position registered by a user on the program;
a step of issuing the CPU forced stop signal from the emulator device to the CPU at an issuance position and timing of the CPU forced stop signal based on the tracing information in execution of the program; and
a step of stopping an operation of execution of the program by the CPU of the system in response to an input of the CPU forced stop signal at the stop target position or a position prior to it, and acquiring an event at the stop target position.

11. The failure analysis method according to claim 10,
wherein the step of determining an issuance position of the CPU forced stop signal includes:
a step of acquiring a first time from when first data of contents of the tracing is stored in the CPU by the debugging function of the CPU to when it is transmitted to the emulator device;
a step of acquiring a second time from when the debugging function of the CPU transmits the first data to the emulator device to when the emulator device receives the first data;
a step of acquiring a third time when the emulator device determines whether the CPU forced stop signal is issued or not based on the received first data;
a step of acquiring a fourth time from when the emulator device issues and outputs the CPU forced stop signal to the debugging function of the CPU to when the CPU forced stop signal is inputted to the CPU and an operation of execution of the program is stopped; and
a step of determining an issuance position and timing of the CPU forced stop signal based on combined time of the first to fourth times.

12. The failure analysis method according to claim 10, further comprising:
a step of setting definition of the required time and the process steps in advance in order to determine the issuance position of the CPU forced stop signal,
wherein, in the step of determining the issuance position of the CPU forced stop signal, the issuance position of the CPU forced stop signal is determined based on the setting.

13. The failure analysis method according to claim 10,
wherein the CPU of the target system has a step executing function for the program, and
the CPU of the target system performs:
a step of stopping an operation of execution of the program in response to an input of the CPU forced stop signal from the emulator device at a position prior to the stop target position; and
a step of executing steps of the program up to the stop target position by the step executing function, thereby acquiring an event at the stop target position.

14. The failure analysis method according to claim 10, further comprising:
a step of registering event information relating to execution of the event tracing by a user;
a step of storing data of the tracing from the CPU of the target system;

a step of comparing the data of the tracing and the data of the event information, thereby determining whether it is a target of the tracing and the CPU forced stop signal is issued; and a step of displaying the data of the tracing based on contents of the event information.

15. The failure analysis method according to claim 10, further comprising:

a step of analyzing a relation of calling of a function by tracing back process steps of execution program of the CPU in accordance with the event generation position registered by a user; and a step of determining the issuance position of the CPU forced stop signal in accordance with the analysis result.

16. The failure analysis method according to claim 10, further comprising:

a step of analyzing a relation of a branch source address and a branch destination address in a position including all branch commands in the execution program of the CPU; and a step of determining all the issuance positions of the CPU forced stop signal corresponding to the event generation position.

* * * * *